Figure 1:
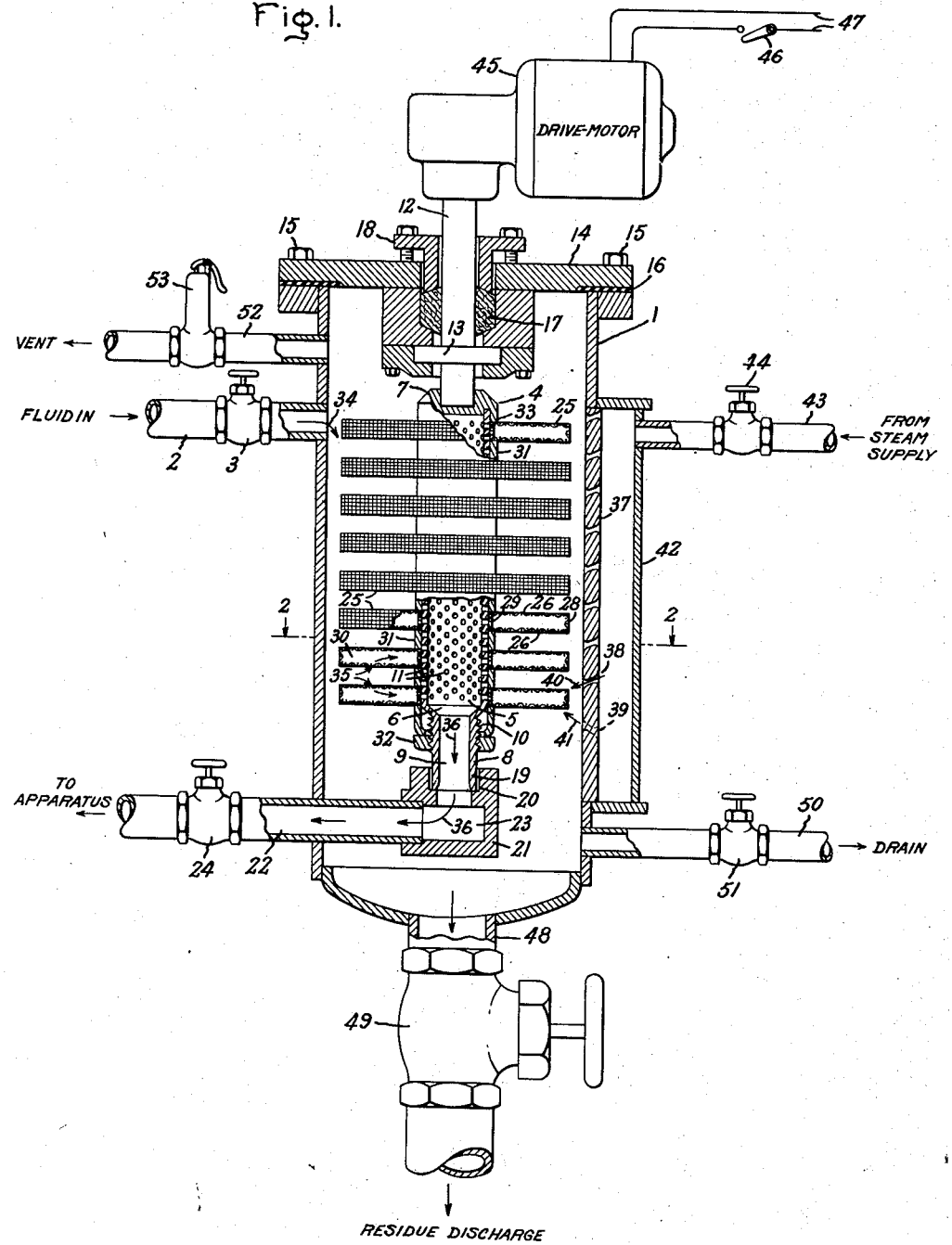

Sept. 8, 1953  J. J. PRENDERGAST  2,651,418
FUEL OIL FILTER UNIT
Filed Nov. 30, 1949  2 Sheets-Sheet 2

Inventor:
James J. Prendergast,
by Ernest C. Britton
His Attorney.

Patented Sept. 8, 1953

2,651,418

UNITED STATES PATENT OFFICE 2,651,418

FUEL OIL FILTER UNIT

James J. Prendergast, Erie, Pa., assignor to General Electric Company, a corporation of New York Application November 30, 1949, Serial No. 130,245

2 Claims. (Cl. 210—182).

This invention relates to fuel oil filters and more particularly to a fuel oil filter having means for cleaning the filter elements.

Fluid filters are utilized in many applications including fuel supply systems for combustion apparatus such as gas turbines. In such installations, the fluid being filtered, i. e., fuel oil, may in the case of residual oil at the bottom of the tank contain bottom solid and water in excess of 2% and, furthermore, the oil is known to contain flocculent particles of carbon. In gas turbines particularly, the combustion equipment subsequent to the fuel supply system requires that the fuel oil be filtered to a high degree of cleanliness which dictates the provision of fine filter openings. This requirement, however, increases the probability of clogged filters and results in proportionately larger amounts of filter residue. It is, therefore, desirable in the design of oil filters for use with gas turbine fuel supply systems to provide means for readily cleaning the filter elements and for removing the filtered foreign matter from the filtered unit. Furthermore, in cases where the gas turbine is utilized as a prime mover in a locomotive, it is also desirable to design the oil filter to permit cleaning without the necessity of disassembling the filter unit.

An object of this invention is to provide an improved fluid filter.

Another object of this invention is to provide an improved fluid filter having means for cleaning the filter elements.

A further object of this invention is to provide an improved fluid filter having means for cleaning the filter elements and for removing the filtered foreign matter therefrom.

A still further object of this invention is to provide an improved fluid filter having means for cleaning the filter elements without disassembling the unit.

Further objects and advantages of this invention will become apparent and the invention will be better understood from the following description referring to the accompanying drawings, and the features of novelty which characterize this invention will be pointed out with particularity in the claims annexed to and forming part of this specification.

In accordance with this invention, there is provided a fluid filter unit having a chamber member with an inlet for introducing the fluid to be filtered. A filter element supporting member having a filtered fluid conducting passage formed therein is rotatably arranged in the chamber. A plurality of openings are formed in the wall of the supporting member communicating with the passage for admitting filtered fluid thereto. A discharge passage is provided extending out of the chamber and communicating with the supporting member passage for removing the filtered fluid. A plurality of annular filter elements formed of screen material, each having an annular cavity formed therein, are secured to the filter supporting member with their cavities communicating with the supporting member openings so that the fluid passes through the screen, the cavity, and the openings in the supporting member wall into the passage. In order to clean the filter elements to remove the accumulation of filtered residue, a plurality of orifices are provided in a wall of the chamber for directing a high velocity jet of cleaning medium, such as steam, onto both sides of each filter element. Another discharge passage is provided for removing the filtered residue from the chamber. Means may be provided for rotating the filter element supporting member and the filter elements so that the jets of cleaning medium impinge on substantially the entire area of the filter elements. Means may also be provided to drain the fluid from the chamber so that the filter elements may be cleaned and for venting air from the chamber when it is initially filled with fluid.

Figure 2:
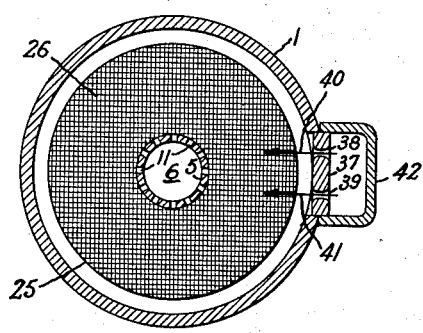
Figure 3:
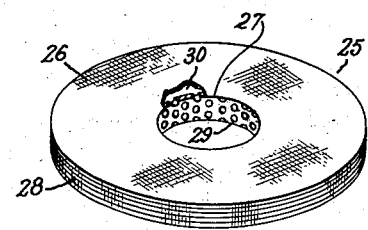
Figure 4:
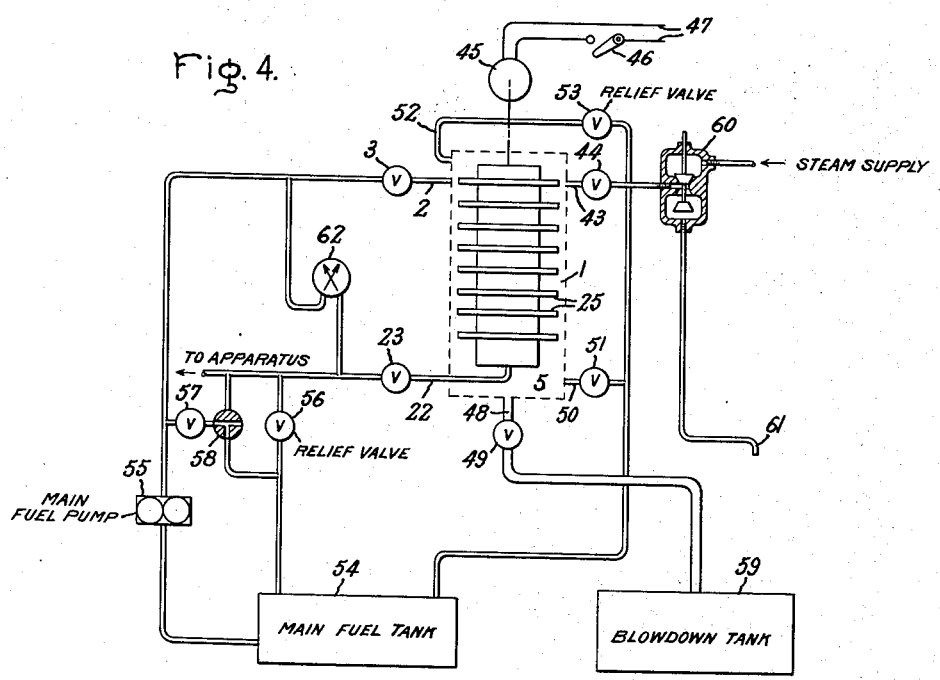

In the drawing, Fig. 1 is a side elevational view, partly in section, illustrating the improved fluid filter of this invention; Fig. 2 is a cross-sectional view taken along the line 2—2 of Fig. 1; Fig. 3 is a perspective view of one of the filter elements of Figs. 1 and 2; and Fig. 4 illustrates a fuel supply system for combustion apparatus utilizing the improved fluid filter of this invention.

Referring now to Fig. 1, there is shown a filter unit constructed in accordance with this invention having a fluid containing chamber 1 with an inlet 2 for introducing the fluid to be filtered thereto. Valve 3 is arranged in the inlet line 2 to regulate the flow of fluid into the chamber 1 and to shut off the flow of fluid when the filter elements are to be cleaned, as will be hereinafter described. A rotatable filter element supporting member, generally identified as 4, is arranged in the chamber 1. The filter supporting member 4 is formed of a cylindrical body portion 5 having a filtered fluid conducting passage 6 formed therein and a cap portion 7 to which the cylindrical body portion is attached, in any suitable manner, as by welding. The body portion 5 is provided with an extension 8 having a passage 9 formed therein communicating with the fluid conducting passage 6. The extension 8 has a threaded external portion 10 adjacent its junction with the body portion 5. The cylindrical body portion 5 is also provided with a plurality of openings 11 in its circumferential wall which communicate with the fluid conducting passage 6.

The cap portion 7 of the rotatable filter supporting member 4 is secured to a rotatable shaft 12 in any suitable manner and the thrust collar 13 of the shaft is journaled in a suitable retainer carried by cover plate 14 of chamber member 1. The cover plate 14 is secured to the chamber member 1 in any suitable manner, as by bolts 15, and an annular gasket member 16 serves to prevent leakage of the fluid contained in the chamber. Packing 17 surrounds the rotatable shaft 12 for preventing the travel of fluid from the chamber member 1 along the shaft and is retained in position by packing retainer 18. The lower extremity 19 of the filter element supporting member extension 8 is rotatably supported in a suitable steady bearing 20 formed in extension portion 21 of discharge passage 22. The discharge passage 22, which extends out of the chamber member 1, communicates with the filtered fluid conducting passage 6 in the body portion 5 of filter element supporting member 4 through passage 9 in the filter element supporting member extension 8 and cavity 23 formed in the extension portion 21 of the discharge passage 22. Bearing 20 has clearances reduced to form a seal between the fluid in container 1 and the filtered fluid in passage 22 and cavity 23. Valve 24 in the discharge passage 22 serves to regulate the flow of filtered fluid from the filter unit to the apparatus to which the unit is connected and is closed during the period in which the filter elements are being cleaned, as will be hereinafter described.

In order to provide for filtering the fluid introduced into the chamber member 1 through inlet passage 2, a plurality of annular filter elements generally identified as 25 are provided. Referring now specifically to Fig. 3, it will be seen that each of the filter elements 25 is an annular washer-shaped body formed of screen material having two annular spaced apart sides 26 with apertures 27 formed therein. The two annular sides are joined by an outer peripheral screen wall 28 and an inner peripheral perforated wall 29 which define with the sides 26 an annular cavity 30. The washer-shaped filter elements 25 are assembled over the cylindrical body portion 5 of the filter element supporting member 4 by means of the apertures 27 and are spaced apart by cylindrical spacing members 31. The filter elements 25 and the cylindrical spacing members 31 are retained in assembled relation between a nut 32 engaging threaded portion 10 of the cylindrical body portion extension 8 and an annular shoulder portion 33 formed on the cap portion 7 of the filter element supporting member 4. Thus, the cavities 30 of the filter elements 25 communicate with the filtered fluid conducting passage 6 of the cylindrical body portion 5 through openings 11.

In operation, the fluid to be filtered enters the chamber member 1 through inlet 2, as shown by the arrow 34 and passes through the sides 26 and outer peripheral walls 28 of the filter elements 25 into the annular cavities 30, as shown by the arrows 35. The filtered fluid then passes from the cavities 30 into the filtered fluid conducting passage 6 through the openings 11 and thence into the passage 9, cavity 23, and discharge passage 22, as shown by the arrows 36.

It will be readily seen that filtered foreign matter or residue will accumulate on the screen sides 26 of the filter elements 25 and to clean the filter elements to remove this filtered residue, the arrangement now to be described is provided. The chamber member 1 is provided with a longitudinal wall section of increased thickness 37 in which a plurality of orifices 38 and 39 are arranged. Each of the orifices 38 is angled on the order of 15° to 20° with respect to the upper side 26 of a filter element 25 while each of the orifices 39 is angled by the same amount with respect to the bottom screen side. The orifices 38 and 39 respectively act as nozzles to direct high velocity jets of cleaning medium, such as steam, onto both sides 26 of each filter element 25, as shown by the arrows 40 and 41 respectively. The cleaning medium is supplied to the orifices 38 and 39 by a header member 42 which is supplied by the cleaning medium inlet line 43. Valve 44 in the cleaning medium inlet line 43 is utilized to regulate the supply of cleaning medium to the header 42 and the orifices 38 and 39 and is shut off during the period that the unit is filtering fluid. In order that the high velocity jets 40 and 41 from the orifices 38 and 39 may impinge on substantially the entire area of the sides 26 of the filter elements 25, the rotatable shaft 12 is driven by a drive motor 45. Thus, by closing switch 46 in power supply line 47, the drive motor 45 rotates the filter element supporting member 4 and the filter elements 25 so that the high velocity jets 40 and 41 of cleaning medium from the nozzles 38 and 39 scrub the entire area of the filter element sides 26.

In order to remove the filtered residue from the chamber member 1 after it has been cleaned from the filter elements 25, a blow-down discharge line 48 is provided in the bottom of the chamber member 1. Valve 49 in the blow-down discharge line 48 serves to close this discharge line when the chamber member 1 is filled with fluid. A drain line 50 is used to drain the fluid from the chamber member 1 prior to cleaning the filter elements 25 and valve 51 serves to close this line when the filter unit is in the filtering cycle. A vent line 52 also communicates with the chamber member 1 and serves to remove air from the chamber when it is being filled initially with fluid. A pressure relief valve 53 is provided in the vent line 52.

Referring now to Fig. 4 in which like elements of Fig. 1 are indicated by like reference numerals, there is shown schematically a complete fuel supply system for combustion apparatus, such as a gas turbine, utilizing the improved filtering unit of this invention. Here the fuel is pumped from the main fuel storage tank 54 to the filter unit chamber member 1 by fuel pump 55, fuel entering the chamber member 1 through valve 3 and inlet line 2. After passing through the filter elements 25 into the filtered fluid conducting passage 6, the filtered fuel is discharged to the apparatus through discharge line 22 and valve 24. A pressure relief valve 56 is interposed between the discharge line 22 and the main fuel storage tank 54 and an emergency by-pass valve 57 and by-pass cock 58 permit supplying the apparatus by by-passing the filter unit completely or feeding the output of the pump 55 back to the main fuel storage tank 54 for preliminary heating of fuel. Vent line 52 is connected to the main fuel storage tank 54 through pressure relief valve 53, and drain line 50 and drain valve 51 also discharge to the main fuel storage tank 54. The blow-down discharge passage 48 and the valve 49 are discharged to a blow-down tank 59 in which the residue removed from the filter unit is accumulated. The blow-down tank may be provided with suitable means for removing the accumulated residue at periodic intervals. Three-way valve 60 prevents leakage of oil back into the steam supply system by opening a passage 61 directly overboard.

During the filtering operation, steam valve 44, drain valve 51, blow-down valve 49, and by-pass valve 57 are closed and inlet valve 3 and discharge valve 24 are opened. When fuel is first introduced to the chamber member 1, the pressure relief valve 53 is held open for a brief period of time to permit venting of the air in the chamber as it fills with fuel. When the filter elements 25 have become sufficiently clogged to necessitate cleaning, as indicated by the presssure gage 62 which measures the pressure differential between the inlet line 2 and the discharge line 22, the inlet valve 3 and discharge valve 24 are closed and the drain valve 51 is opened to drain the fuel from the chamber member 1. The steam valve 44 is then opened briefly to purge the chamber member 1 of fuel. The steam valve 44 and the drain valve 51 are then closed and the blow-down valve 49 is then opened. The steam valve 44 is then opened again and the motor 45 is started by switch 46 to rotate the filter elements 25 for cleaning by the steam jets 40 and 41. When the filter elements 25 have been subjected to the steam jets 40 and 41 for the proper length of time, the steam valve 44 and blow-down valve 49 are again closed and the filter unit is again ready for the filtering operation. It will now be readily apparent that in order to provide for continuous operation of the apparatus without shutdown, two parallel filter units may be employed, one of which will be in filtering operation while the other is being cleaned as shown in my copending application Serial Number 192,320, filed October 26, 1950 and assigned to the assignee of the present application.

It will now be readily apparent that this invention provides an improved fluid filtering unit wherein the filtered residue is removed from the filter elements and discharged from the filter unit without the necessity for disassembling the filter device.

While I have illustrated and described particular embodiments of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of the invention.

What I claim as new and desire to secure by Letters Patent of the United States is:

1. A filter unit for fuel oil comprising a chamber member having inlet means for introducing fuel oil to be filtered into said chamber, a filter supporting member positioned in said chamber and having a filtered fuel oil conducting passage formed therein, said supporting member having a plurality of screen filter means secured thereto and communicating with said passage for filtering said fuel oil to remove foreign matter therefrom, discharge means communicating with said passage and extending out of said chamber for removing filtered fuel oil from said passage, a header member arranged on the exterior of said chamber and having a common wall therewith, means for introducing steam to said header member, said common wall having a plurality of openings formed therein communicating with said chamber and said header forming nozzles for respectively directing high velocity jets of steam onto said screen filter means for removing the accumulation of fuel oil residue therefrom, some of said openings being angled approximately 15° with respect to the upper surfaces of said screen filter means and the remainder of said openings being angled approximately 15° with respect to the under surfaces of said screen filter means thereby to direct steam onto both surfaces of each of said screen filter means so as to remove the fuel oil residue from said screen filter means.

2. A filter unit for fuel oil comprising a chamber member having inlet means for introducing the fuel oil to be filtered into said chamber, a filter supporting member positioned in said chamber and having a filtered fuel oil conducting passage formed therein, said supporting member having a plurality of screen filter means secured thereto and communicating with said passage for filtering said fuel oil to remove foreign matter therefrom, discharge means communicating with said passage and extending out of said chamber for removing filtered fuel oil from said passage, said chamber member having a longitudinal wall section of greater thickness than the remainder of the wall of said chamber member, a header member arranged on the exterior of said wall section, means for supplying steam to said header member, said wall section having a plurality of openings formed therein communicating with said chamber and said header member for respectively directing high velocity jets of steam onto said screen filter means for removing the accumulation of fuel oil residue therefrom, said openings being angled approximately 15° with respect to the surfaces of said screen filters so that said steam jets remove the fuel oil residue from said screen filter means, and a second discharge means for removing said filtered fuel oil residue from said chamber.

JAMES J. PRENDERGAST.

References Cited in the file of this patent

UNITED STATES PATENTS

| Number | Name | Date |
|---|---|---|
| 1,219,796 | Atkins et al. | Mar. 20, 1917 |
| 1,344,215 | Sweetland | June 22, 1920 |
| 1,510,568 | Sweetland | Oct. 7, 1924 |
| 1,591,821 | Heaton | July 6, 1926 |
| 1,867,397 | Brace et al. | July 12, 1932 |
| 1,871,207 | Whitman | Aug. 9, 1932 |
| 2,087,775 | Matthews | July 20, 1937 |
| 2,347,927 | Paterson et al. | May 2, 1944 |
| 2,411,539 | Gunn | Nov. 26, 1946 |
| 2,423,329 | Le Clair | July 1, 1947 |

FOREIGN PATENTS

| Number | Country | Date |
|---|---|---|
| 280,087 | Germany | Nov. 4, 1914 |